(12) United States Patent
Yang et al.

(10) Patent No.: US 11,444,554 B2
(45) Date of Patent: Sep. 13, 2022

(54) ACTUATOR USING BI-DIRECTIONAL ELECTROSTATIC FORCE

(71) Applicants: Industry-Academic Cooperation Foundation, Korea National University of Transportation, Chungys-si (KR); IMAGIS Co., Ltd, Suwon (KR)

(72) Inventors: Tae-Heon Yang, Chungys-si (KR); Han Eol Bae, Suwon (KR); Jong Reep Na, Suwon (KR); Sung Won Kim, Suwon (KR); Sung Un Kim, Suwon (KR)

(73) Assignees: INDUSTRY-ACADEMIC COOPERATION FOUNDATION, KOREA NATIONAL UNIVERSITY OF TRANSPORTATION, Chungys-si (KR); IMAGIS Co., Ltd, Gyeonggi-do (KR)

( * ) Notice: Subject to any disclaimer, the term of this patent is extended or adjusted under 35 U.S.C. 154(b) by 159 days.

(21) Appl. No.: 16/907,770

(22) Filed: Jun. 22, 2020

(65) Prior Publication Data
US 2021/0376762 A1    Dec. 2, 2021

(30) Foreign Application Priority Data
May 27, 2020   (KR) .......................... 10-2020-0063935

(51) Int. Cl.
*H02N 1/00*       (2006.01)
(52) U.S. Cl.
CPC .................................. *H02N 1/002* (2013.01)

(58) Field of Classification Search
CPC . H02N 1/00; H02N 1/004; B06B 1/06; B06B 2201/51; B06B 1/0292
See application file for complete search history.

(56) References Cited

U.S. PATENT DOCUMENTS 3,696,258 A * 10/1972 Anderson ............. H02N 1/004
310/308
6,966,882 B2 * 11/2005 Horst ................... A61H 1/0237
601/33

(Continued)

FOREIGN PATENT DOCUMENTS

JP     2011-206634 A    10/2011
KR    10-1549494 B1     9/2015

(Continued)

*Primary Examiner* — Burton S Mullins
(74) *Attorney, Agent, or Firm* — Novick, Kim & Lee, PLLC; Jae Youn Kim (57) ABSTRACT

Proposed is an actuator using a bi-directional electrostatic force, which generates a bi-directional electrostatic force in order to amplify and vibrate the vibration of a vibrator. The actuator may include an upper electrostatic force generator configured to generate a first electrostatic force in response to a first high voltage signal, a lower electrostatic force generator configured to generate a second electrostatic force in response to a second high voltage signal having a phase difference with the first high voltage signal, and a vibration generator positioned in a space between the upper electrostatic force generator and the lower electrostatic force generator and configured to generate vibration in response to the first and second electrostatic forces.

4 Claims, 6 Drawing Sheets

(56) References Cited

U.S. PATENT DOCUMENTS

| | | | | |
|---|---|---|---|---|
| 8,018,119 B2* | 9/2011 | Matsubara | ............... | H02N 1/08 |
| | | | | 310/309 |
| 8,049,579 B2* | 11/2011 | Walmsley | ................ | H03H 9/24 |
| | | | | 333/186 |
| 8,269,578 B2* | 9/2012 | Phan Le | .............. | H03H 9/2463 |
| | | | | 333/186 |
| 8,624,137 B2* | 1/2014 | Phan Le | .............. | H03H 9/2436 |
| | | | | 200/239 |
| 8,803,401 B2* | 8/2014 | Nakatsuka | ............... | H02N 1/08 |
| | | | | 310/309 |
| 10,119,941 B2* | 11/2018 | Akiyama | ............... | G01N 29/34 |

FOREIGN PATENT DOCUMENTS

| | | |
|---|---|---|
| KR | 10-2016-0069752 A | 6/2016 |
| KR | 10-1861620 B1 | 5/2018 |
| KR | 10-1917614 B1 | 11/2018 |

\* cited by examiner

ACTUATOR USING BI-DIRECTIONAL ELECTROSTATIC FORCE

BACKGROUND

1. Technical Field

The present disclosure relates to an actuator using a bi-directional electrostatic force, and more particularly, to an actuator using a bi-directional electrostatic force, which generates a bi-directional electrostatic force in order to amplify and vibrate the vibration of a vibrator.

2. Related Art

The present application was funded by the Korea SMEs and Startup Agency (KOSME) and Korea Technology and information Promotion Agency for SMEs (TIPA). The research project is for Industrial-Academic Cooperation New Project R&D Voucher Project by the Image Technology Co., LTD. The title of the research project is the Development of 5g Haptic Feedback System for Smart Car Display. The research project identification number is 1425133950 and task number is S2719872. The research period was from Jun. 1, 2019 to May 31, 2020.

Figure 6:
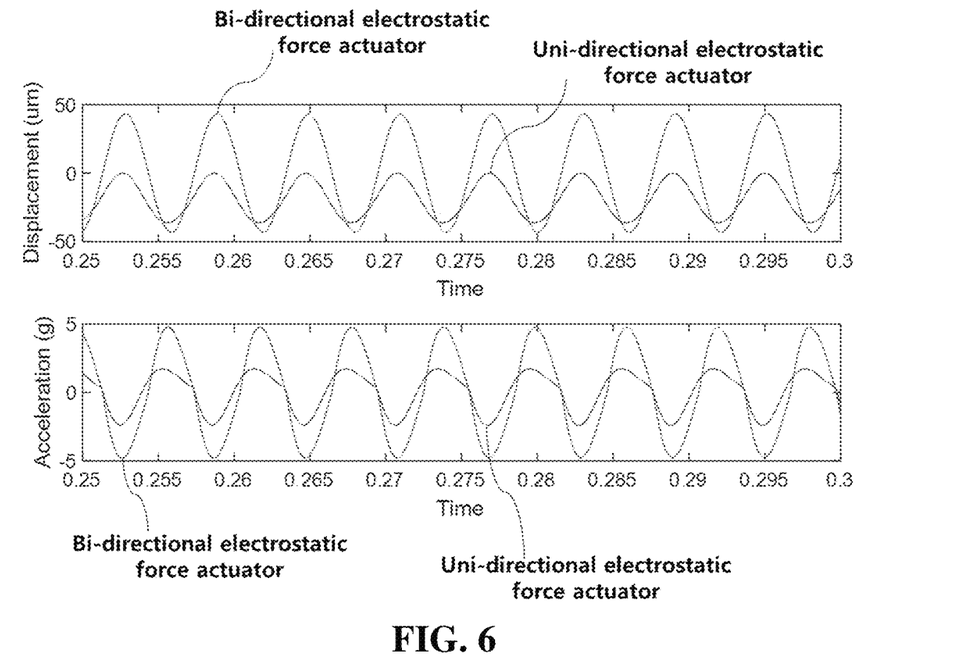
FIG. 6 is a diagram illustrating vibration widths and acceleration forces of the actuator using a bi-directional electrostatic force according to an embodiment of the present disclosure and a conventional actuator using a unidirectional electrostatic force.

An actuator using an electrostatic force disclosed in a conventional patent document (Korean Patent Nos. 10-1861620 and 10-1917614) uses a unidirectional electrostatic force (in particular, using a resonant frequency and a beat frequency). Accordingly, as shown in FIGS. 5 and 6, the vibration width of a vibrator is small, and a higher voltage must be applied in order to increase the vibration width. In particular, there is a problem in that a high voltage of at least 1.5 kV must be applied. The actuator has problems in that a circuit becomes complicated and it is difficult to apply the actuator to a device on which the actuator is mounted as the size of a high voltage is increased.

PRIOR ART DOCUMENT

Patent Document

Korean Patent No. 10-1861620
Korean Patent No. 10-1917614
Japanese Patent Application Publication No. JP 2011-206634
Korean Patent No. 10-1549494
Japanese Patent Application Publication No. JP 07132598
Japanese Patent Application Publication No. 10-2016-0069752
"Capacitive RF MEMS switch dielectric charging and reliability: a critical review with recommendations", WM van Spengen, J. Micromech. Microeng. 22 (2012) 074001 (2012.6.22.)

SUMMARY

An embodiment of the present disclosure is to provide larger amplitude using a high voltage lower than a conventional high voltage by providing a bi-directional electrostatic force.

However, technical objects of the present disclosure are not limited to the aforementioned technical object, and other technical objects not described above may be evidently understood by a person having ordinary skill in the art to which the present disclosure pertains from the following description.

In an embodiment, a actuator using a bi-directional electrostatic force includes an upper electrostatic force generator configured to generate a first electrostatic force in response to a first high voltage signal, a lower electrostatic force generator configured to generate a second electrostatic force in response to a second high voltage signal having a phase difference with the first high voltage signal, and a vibration generator positioned in a space between the upper electrostatic force generator and the lower electrostatic force generator and configured to generate vibration in response to the first and second electrostatic forces.

Furthermore, the first high voltage signal and the second high voltage signal have a phase difference of 180 degrees.

Furthermore, the first high voltage signal is applied to the upper electrostatic force generator during a first half cycle. The second high voltage signal is alternately applied to the lower electrostatic force generator during a second half cycle in which the first high voltage signal is not applied.

Furthermore, each of the first high voltage signal and the second high voltage signal has a positive value.

Furthermore, the first electrostatic force is generated during the first half cycle of the first high voltage signal and provides an elastic vibration power amplified by upward pulling the vibration generator. The second electrostatic force is generated during the second half cycle of the second high voltage signal and provides an elastic vibration power amplified by downward pulling the vibration generator. A bi-directional electrostatic force is generated by the first electrostatic force and the second electrostatic force.

Furthermore, the actuator further includes a high voltage generator configured to generate and supply a present DC high voltage, a controller configured to generate first and second high voltage control signals so that the first and second high voltage signals are generated, respectively, an upper electrode high-voltage signal generator configured to generate the first high voltage signal having the positive value in response to the first high voltage control signal and to supply the first high voltage signal to the upper electrostatic force generator, and a lower electrode high-voltage signal generator configured to generate the second high voltage signal, having the positive value and a phase difference of 180 degrees with the first high voltage signal, in response to the second high voltage control signal and to supply the second high voltage signal to the lower electrostatic force generator.

Furthermore, the upper electrode high-voltage signal generator includes an upper electrode charging signal generator configured to generate an upper electrode charging signal in response to the first high voltage control signal, an upper electrode discharging signal generator configured to generate an the upper electrode discharging signal in response to the first high voltage control signal, an upper electrode first-switching unit configured to generate a first AC high voltage by switching the DC high voltage provided by the high voltage generator in response to the upper electrode charging signal, and an upper electrode second-switching unit configured to supply the first AC high voltage to the upper electrostatic force generator during the first half cycle and to discharge electric charges charged in the upper electrostatic force generator during the second half cycle in response to the upper electrode discharging signal.

Furthermore, the lower electrode high-voltage signal generator includes a lower electrode charging signal generator configured to generate a lower electrode charging signal in response to the second high voltage control signal, a lower electrode discharging signal generator configured to generate a lower electrode discharging signal in response to the second high voltage control signal, a lower electrode first-switching unit configured to generate a second AC high voltage having a phase difference of 180 degrees with the first AC high voltage by switching the DC high voltage provided by the high voltage generator in response to the lower electrode charging signal, and a lower electrode second-switching unit configured to supply the second AC high voltage to the lower electrostatic force generator during the second half cycle in which the first AC high voltage is not applied and to discharge electric charges charged in the lower electrostatic force generator during the second half cycle in response to the lower electrode discharging signal.

Furthermore, the sequence in which the AC high voltage is applied to any one electrostatic force generator and electric charges charged in the other electrostatic force generator are discharged during one half cycle is alternately repeated with respect to the electrostatic force generators.

BRIEF DESCRIPTION OF THE DRAWINGS

The following accompanying drawings attached to this specification illustrate embodiments of the present disclosure and function to facilitate further understanding of the technical spirit of the present disclosure along with the detailed description of the present disclosure. Accordingly, the present disclosure should not be construed as being limited to only contents illustrated in the drawings.

DESCRIPTION OF REFERENCE NUMERALS

10: actuator using bi-directional electrostatic force
11,12: base 100: upper electrostatic force generator
110: upper electrode unit
120: upper insulating film unit
200: upper interval unit 300: vibration generator
310: mass part
320: elastic part (or radial beam spring part)
330: support part 400: lower interval unit
500: lower electrostatic force generator
510: lower electrode unit
520: lower insulating film unit 610: high voltage generator 620: controller
630: upper electrode high-voltage signal generator
631: upper electrode charging signal generator
632: upper electrode discharging signal generator
633: upper electrode first-switching unit
634: upper electrode second-switching unit
640: lower electrode high-voltage signal generator
641: lower electrode charging signal generator
642: lower electrode discharging signal generator
643: lower electrode first-switching unit
644: lower electrode second-switching unit

DETAILED DESCRIPTION

Hereinafter, exemplary embodiments of the present disclosure are described in detail with reference to the accompanying drawings. Furthermore, it should be noted that the embodiments to be described below do not unreasonably limit the contents of the present disclosure written in the claims and all the elements described in the embodiments may not be considered to be essential as means for solving the present disclosure. Furthermore, a description of contents evident in a conventional technology and to those skilled in the art may be omitted, and reference to the description of such an omitted element (or method) and function will be sufficiently made without departing from the technical spirit of the present disclosure.

An actuator 10 using a bi-directional electrostatic force according to an embodiment of the present disclosure is an actuator for further amplifying elastic vibration by providing a bi-directional electrostatic force (i.e., different direction electrostatic forces) to a mass part 310 that elastically vibrates in a vertical direction. The actuator 10 using a bi-directional electrostatic force according to an embodiment of the present disclosure is described more specifically with reference to the accompanying drawings.

Figure 1:
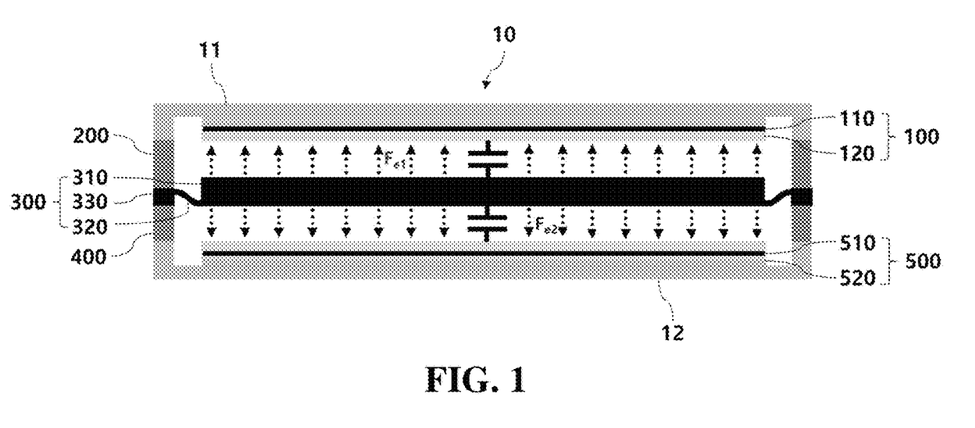
FIG. 1 is a diagram illustrating a cross section of an actuator using a bi-directional electrostatic force according to an embodiment of the present disclosure.
Figure 2:
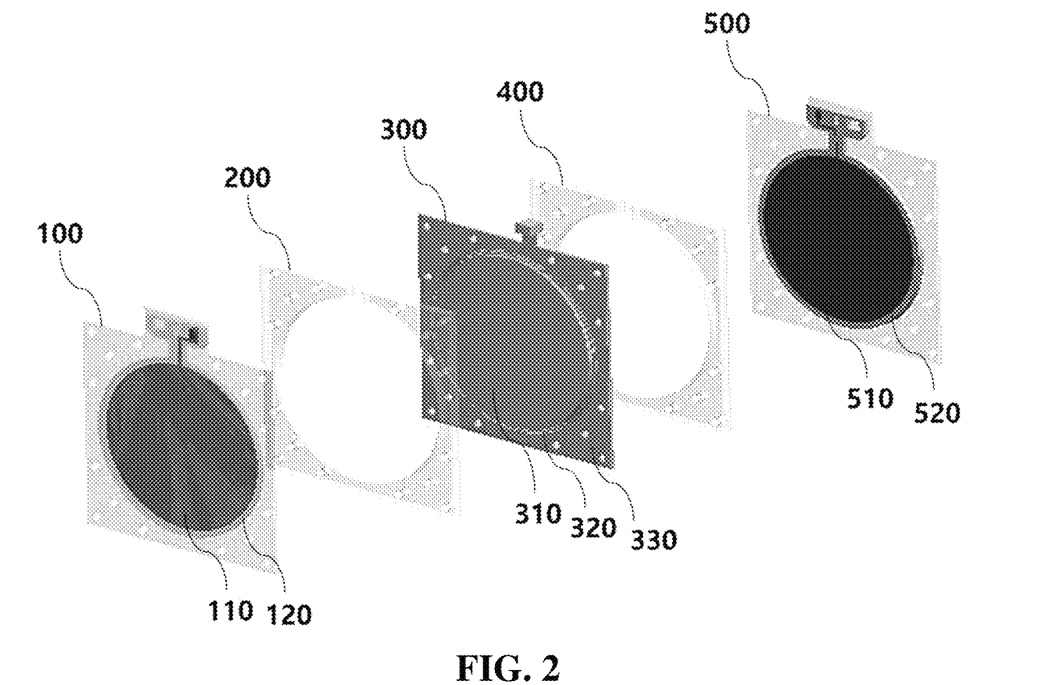
FIG. 2 is a diagram illustrating an upper electrostatic force generator, an upper interval unit, a vibration generator, a lower interval unit, and a lower electrostatic force generator according to an embodiment of the present disclosure.
Figure 4:
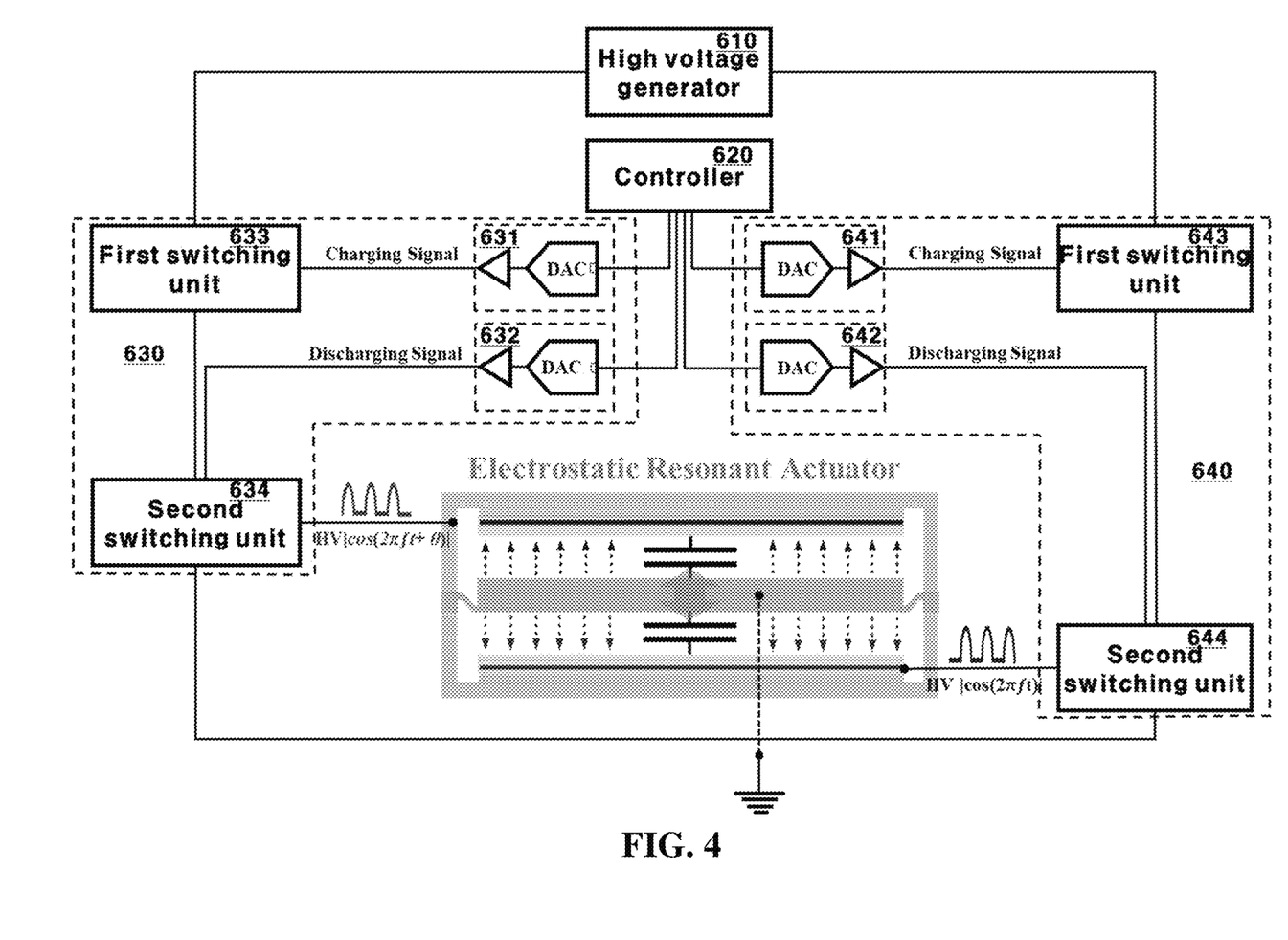
FIG. 4 is a diagram schematically illustrating a configuration for generating the first and second AC high voltages according to an embodiment of the present disclosure.
Figure 5A:
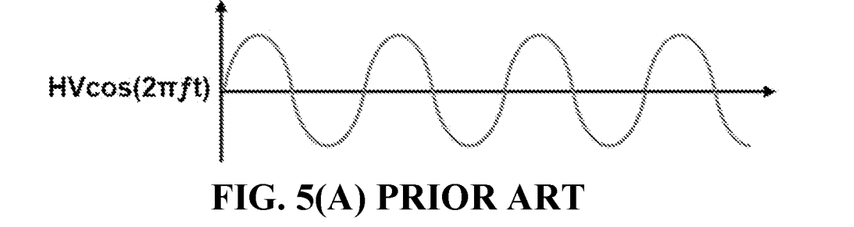
FIGS. 5(a) and 5(b) are diagrams illustrating the applied signal and vibration width of a conventional actuator using a unidirectional electrostatic force.
Figure 5B:
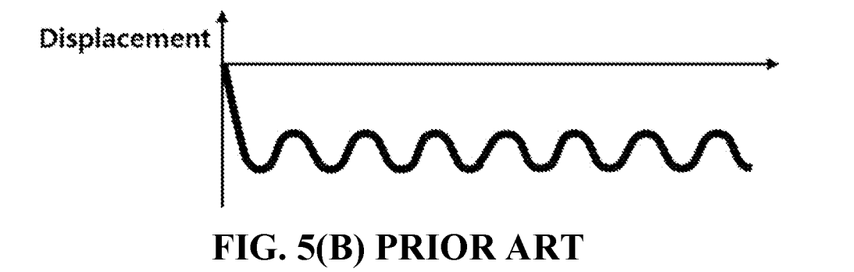
Figure 5C:
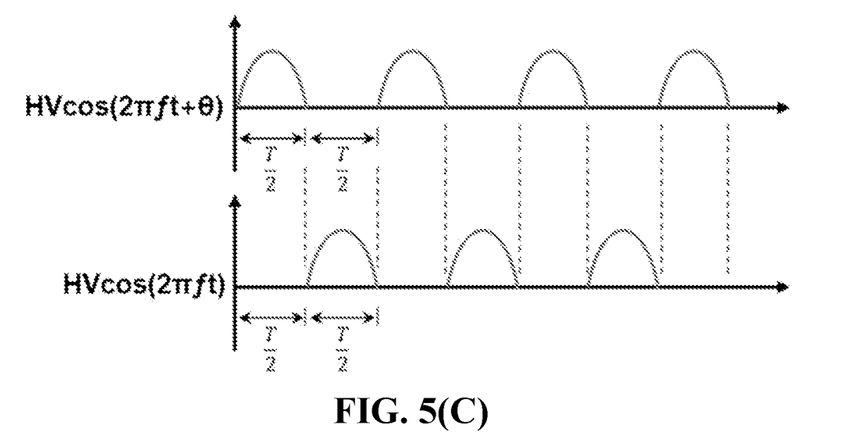
FIGS. 5(c) and 5(d) are diagrams illustrating the applied signal and vibration width of the actuator using a bi-directional electrostatic force according to an embodiment of the present disclosure.
Figure 5D:
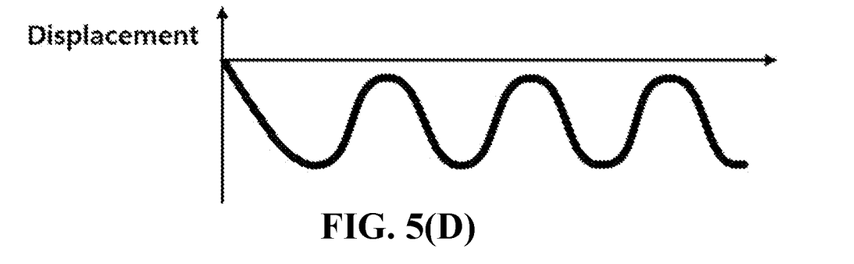

As shown in FIGS. 1 and 2, the actuator 10 includes an upper electrostatic force generator 100, an upper interval unit 200, a vibration generator 300, a lower interval unit 400, and a lower electrostatic force generator 500. As shown in FIG. 4, the actuator 10 includes further includes a high voltage generator 610, a controller 620, an upper electrode high-voltage signal generator 630, and a lower electrode high-voltage signal generator 640 for generating a high voltage signal applied to the electrostatic force generators 100 and 500.

First, referring to FIG. 1, the upper electrostatic force generator 100 and the lower electrostatic force generator 500 are disposed within the bases 11 and 12. A mass part 310 is positioned in the space between the upper electrostatic force generator 100 and the lower electrostatic force generator 500, and vibrates up and down in response to the generation of a bi-directional electrostatic force. In this case, the upper electrostatic force generator 100 generates an upward electrostatic force ($F_{e1}$) with respect to the mass part 310, and the lower electrostatic force generator 500 generates a downward electrostatic force ($F_{e2}$) with respect to the mass part 310. Accordingly, when elastically vibrating upward, the mass part 310 provides the upward electrostatic force ($F_{e1}$), so the elastic vibration of the mass part 310 is further amplified upward. When elastically vibrating downward, the mass part 310 provides the downward electrostatic force ($F_{e2}$), so the elastic vibration of the mass part 310 is further amplified downward.

The upper electrostatic force generator 100 includes an upper electrode unit 110 and an upper insulating film unit 120. The upper electrode unit 110 is included within the upper insulating film unit 120. The upper electrostatic force generator 100 is positioned on the upper side of the mass part 310. Furthermore, the lower electrostatic force generator 500 corresponding to the upper electrostatic force generator 100 includes a lower electrode unit 510 and a lower insulating film unit 520. The lower electrode unit 520 is included within the lower insulating film unit 520. The lower electrostatic force generator 500 is positioned on the lower side of the mass part 310.

For the upward elastic vibration of the mass part 310, a preset upward vibration space (i.e., the distance between the upper electrostatic force generator 100 and the mass part 310) is formed between the upper electrostatic force generator 100 and the mass part 310. Furthermore, for the downward elastic vibration of the mass part 310, a preset downward vibration space (i.e., the distance between the mass part 310 and the lower electrostatic force generator 500) is formed between the mass part 310 and the lower electrostatic force generator 500.

The distance between the upward vibration space and the downward vibration space is adjusted by the upper interval unit (or upper spacer) 200 and the lower interval unit (or lower spacer) 400 illustrated in FIG. 2. The upper interval unit 200 is positioned in the space between the upper electrostatic force generator 100 and the vibration generator 300, thus providing the upward vibration space. The lower interval unit 400 is positioned in the space between the vibration generator 300 and the lower electrostatic force generator 500, thus providing the downward vibration space. The distance between the upward vibration space and the downward vibration space may be differently applied depending on an environment in which the actuator 10 is mounted.

As shown in FIG. 1, the upward electrostatic force ($F_{e1}$) is generated in the upward vibration space by the upper electrostatic force generator 100. The downward electrostatic force ($F_{e2}$) is generated in the downward vibration space by the lower electrostatic force generator 500.

The vibration generator 300 includes the mass part (or mass body) 310, an elastic part (radial beam spring part) 320, and a support part 330. The mass part 310 is a body having a mass, and is electrically connected to the ground. The elastic part 320 is formed in the outer circumference of the mass part 310 to include a slit (not illustrated) so that the mass part 310 elastically vibrates. The support part 330 enables the mass part 310 to be elastically supported through the elastic part 320. That is, as shown in FIG. 2, the support part 330 is positioned in the outermost of the vibration generator 300. The mass part 310 is positioned at the center of the vibration generator 300. The elastic part 320 is formed in the space between the mass part 310 and the support part 330.

Figure 3:
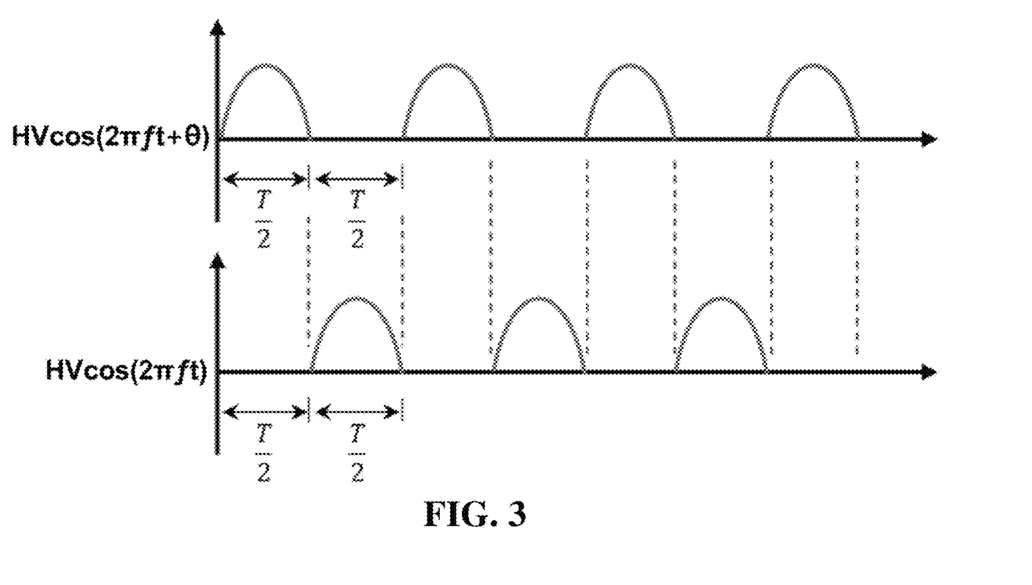
FIG. 3 is a diagram illustrating first and second AC high voltages applied to the upper electrode unit of the upper electrostatic force generator and the lower electrode unit of the lower electrostatic force generator, respectively, according to an embodiment of the present disclosure.

As shown in FIG. 3, during the first half of one cycle (T), a first AC high voltage (HV $\cos(2\pi ft+\theta)$) having a phase advanced by 180 degrees is applied to the upper electrode unit 110. During the second half of the cycle (T), a second AC high voltage (HV $\cos(2\pi ft)$) having a phase by 180 degrees delayed compared to the first AC high voltage is applied to the lower electrode unit 510. In this case, the meaning that the phase is advanced by 180 degrees means that as shown in FIG. 3, after the first AC high voltage is applied during the first half cycle, the second AC high voltage is applied during the second half cycle. Accordingly, the AC high voltage having a positive value and a phase difference of 180 degrees is applied to each of the upper electrode unit 110 and the lower electrode unit 510 during one half cycle. The first and second AC high voltages are sequentially repeated and applied to the upper electrode unit 110 and the lower electrode unit 510.

In order to alternately and repeatedly apply the first AC high voltage and the second AC high voltage having a phase difference of 180 degrees sequentially during the first and second half cycles, the phases need to be precisely matched and applied to the upper electrode unit 110 and the lower electrode unit 510.

In FIG. 3, the voltage size of each of the first and second AC high voltages may be 0.5 k~4 kV depending on an installation environment. An embodiment of the present disclosure has advantages in that a high voltage lower than the existing high voltage can be applied and the mass part 310 can be further vibrated because a bi-directional electrostatic force is generated to elastically amplify and vibrate the mass part 310.

As shown in FIG. 4, the high voltage generator 610 generates a DC high voltage of about 1.5 kV and supplies the DC high voltage to an upper electrode first-switching unit 633.

The controller 620 generates first and second high voltage control signals to generate the first AC high voltage (HV $\cos(2\pi ft+\theta)$) and the second AC high voltage (HV $\cos(2\pi ft)$). The generated first high voltage control signal is transmitted to an upper electrode charging signal generator 631 and an upper electrode discharging signal generator 632. Furthermore, the generated second high voltage control signal is transmitted to a lower electrode charging signal generator 641 and a lower electrode discharging signal generator 642.

The upper electrode high-voltage signal generator 630 generates the first AC high voltage signal (HV $\cos(2\pi ft+\theta)$) having a positive value in response to the first high voltage control signal of the controller 620, and supplies the first AC high voltage signal to the upper electrode unit 110. Furthermore, the lower electrode high-voltage signal generator 640 generates the second AC high voltage signal (HV $\cos(2\pi ft)$), having a positive value and a phase difference of 180 degrees with the first AC high voltage signal, in response to the second high voltage control signal of the controller 620, and supplies the second AC high voltage signal to the lower electrode unit 510. The upper electrode high-voltage signal generator 630 and the lower electrode high-voltage signal generator 640 are described in more detail below.

The upper electrode high-voltage signal generator 630 includes the upper electrode charging signal generator 631, the upper electrode discharging signal generator 632, the upper electrode first-switching unit 633, and an upper electrode second-switching unit 634.

The upper electrode charging signal generator 631 generates an upper electrode charging signal in response to the first high voltage control signal from the controller 620. The upper electrode discharging signal generator 632 generates an upper electrode discharging signal in response to the first high voltage control signal from the controller 620. Specifically, the upper electrode charging signal generator 631 and the upper electrode discharging signal generator 632 may be configured as a digital-to-analog converter (DAC) and an amplifier, respectively.

The upper electrode first-switching unit 633 generates a first AC high voltage by switching a DC high voltage provided by the high voltage generator 610 in response to the upper electrode charging signal of the upper electrode charging signal generator 631. The generated first AC high voltage is an AC high voltage signal having a positive value (i.e., not having a negative value).

The upper electrode second-switching unit 634 supplies the upper electrode unit 110 with the first AC high voltage generated by the upper electrode first-switching unit 633 during the first half cycle, and electrically connects the upper electrode unit 110 and the ground during the second half cycle in response to the upper electrode discharging signal of the upper electrode discharging signal generator 632 so that electric charges charged in the upper electrode unit 110 are discharged. Since the upper electrode unit 110 is electrically connected to the ground, electric charges charged in the upper electrode unit 110 can be instantly discharged rapidly, and the upward electrostatic force ($F_{e1}$) becomes rapidly extinct. Accordingly, there is an advantage in that the downward elastic amplification and vibration of the mass part 310 by the alternately generated downward electrostatic force ($F_{e2}$) is not hindered.

The lower electrode high-voltage signal generator 640 includes the lower electrode charging signal generator 641, the lower electrode discharging signal generator 642, a lower electrode first-switching unit 643, and a lower electrode second-switching unit 644.

The lower electrode charging signal generator 641 generates a lower electrode charging signal in response to the second high voltage control signal from the controller 620. The lower electrode discharging signal generator 642 generates a lower electrode discharging signal in response to the second high voltage control signal from the controller 620. Specifically, the lower electrode charging signal generator 641 and the lower electrode discharging signal generator 642 may be configured as a DAC and an amplifier, respectively.

The lower electrode first-switching unit 643 generates a second AC high voltage having a phase difference of 180 degrees with the first AC high voltage by switching a DC high voltage provided by the high voltage generator 610 in response to the lower electrode charging signal of the lower electrode charging signal generator 641. The generated second AC high voltage is an AC high voltage signal having a positive value (i.e., not having a negative value).

The lower electrode second-switching unit 644 supplies the lower electrode unit 510 with the second AC high voltage generated by the lower electrode first-switching unit 643 during the first half cycle having a delayed phase of 180 degrees compared to the first AC high voltage (i.e., during one half cycle having a delayed phase of 180 degrees in which the first AC high voltage is not applied), and electrically connects the lower electrode unit 510 and the ground during the second half cycle in response to the lower electrode discharging signal of the lower electrode discharging signal generator 642 so that electric charges charged in the lower electrode unit 510 are discharged. The reason why the electric charges are discharged has been described above.

As described above, the first AC high voltage (HV|cos (2πft+θ)|) is applied during the first half cycle (e.g., during T/2 time), and the second AC high voltage (HV|cos(2πft)|) is applied during the second half cycle (e.g., during T/2 time). In this case, during the second half cycle ($t_2$), the second AC high voltage is applied and simultaneously the upper electrode unit 110 is discharged. During a next first half cycle subsequent to the second half cycle ($t_2$), the first AC high voltage is applied and simultaneously the lower electrode unit 510 is discharged. Accordingly, during one half cycle, the sequence in which the AC high voltage is applied to any one electrode unit and electric charges charged in the other electrode unit are discharged is alternately repeated with respect to the electrode units.

FIG. 5 is a diagram illustrating a comparison between vibration according to a conventional actuator using a unidirectional electrostatic force and vibration according to the actuator using a bi-directional electrostatic force according to an embodiment of the present disclosure. It can be seen that the vibration generated by the actuator using a bi-directional electrostatic force in FIGS. 5(c) and 5(d) is much larger than the vibration generated by the actuator using a unidirectional electrostatic force in FIGS. 5(a) and 5(b). Furthermore, from the results of simulations illustrated in FIG. 6, it can be seen that vibration (or displacement) and an acceleration force are much greater in the bi-direction than in the existing unidirection.

Accordingly, the present disclosure has an effect in that the actuator using a bi-directional electrostatic force can provide greater amplitude of a vibrator using a high voltage lower than a conventional high voltage.

In describing the embodiments of the present disclosure, a description of contents evident in a conventional technology and to those skilled in the art may be omitted, and reference to the description of such an omitted element (or method) and function will be sufficiently made without departing from the technical spirit of the present disclosure. Furthermore, the elements according to an embodiment of the present disclosure have been described, for convenience of a description, and other elements not described in this specification may be added without departing from the technical spirit of the present disclosure.

The configurations and functions of the aforementioned elements have been separated and described for convenience of description only, and any one configuration and function may be integrated into another element and implemented or may be subdivided and implemented.

Although the embodiments of the present disclosure have been described, the present disclosure is not limited to the embodiments and may be modified and applied in various ways. That is, those skilled in the art will easily understand that the present disclosure may be modified in various ways without departing from the gist of the present disclosure. Furthermore, it is to be noted that a detailed description of the known functions and elements related to the present disclosure or a coupling relation between the elements will be omitted if it is deemed to make the gist of the present disclosure unnecessarily vague.

What is claimed is:

1. An actuator using a bi-directional electrostatic force, comprising:
   an upper electrostatic force generator configured to generate a first electrostatic force in response to a first high voltage signal,
   a lower electrostatic force generator configured to generate a second electrostatic force in response to a second high voltage signal having a phase difference with the first high voltage signal, and
   a vibration generator positioned in a space between the upper electrostatic force generator and the lower electrostatic force generator and configured to generate vibration in response to the first and second electrostatic forces,
   wherein the first high voltage signal and the second high voltage signal have a phase difference of 180 degrees, wherein:
   the first high voltage signal is applied to the upper electrostatic force generator during a first half cycle, and the second high voltage signal is alternately applied to the lower electrostatic force generator during a second half cycle in which the first high voltage signal is not applied, wherein each of the first high voltage signal and the second high voltage signal has a positive value, and further comprising:

a high voltage generator configured to generate and supply a present DC high voltage, a controller configured to generate first and second high voltage control signals so that the first and second high voltage signals are generated, respectively, an upper electrode high-voltage signal generator configured to generate the first high voltage signal having the positive value in response to the first high voltage control signal and to supply the first high voltage signal to the upper electrostatic force generator, and a lower electrode high-voltage signal generator configured to generate the second high voltage signal having the positive value in response to the second high voltage control signal and to supply the second high voltage signal to the lower electrostatic force generator.

2. The actuator of claim 1, wherein:

the first electrostatic force is generated during the first half cycle of the first high voltage signal and provides an elastic vibration power amplified by upward pulling the vibration generator, the second electrostatic force is generated during the second half cycle of the second high voltage signal and provides an elastic vibration power amplified by downward pulling the vibration generator, and a bi-directional electrostatic force is generated by the first electrostatic force and the second electrostatic force.

3. The actuator of claim 1, wherein:

the upper electrode high-voltage signal generator comprises:

an upper electrode charging signal generator configured to generate an upper electrode charging signal in response to the first high voltage control signal, an upper electrode discharging signal generator configured to generate an the upper electrode discharging signal in response to the first high voltage control signal, an upper electrode first-switching unit configured to generate a first AC high voltage by switching the DC high voltage provided by the high voltage generator in response to the upper electrode charging signal, and an upper electrode second-switching unit configured to supply the first AC high voltage to the upper electrostatic force generator during the first half cycle and to discharge electric charges charged in the upper electrostatic force generator during the second half cycle in response to the upper electrode discharging signal; and wherein the lower electrode high-voltage signal generator comprises:

a lower electrode charging signal generator configured to generate a lower electrode charging signal in response to the second high voltage control signal, a lower electrode discharging signal generator configured to generate a lower electrode discharging signal in response to the second high voltage control signal, a lower electrode first switch configured to generate a second AC high voltage having a phase difference of 180 degrees with the first AC high voltage by switching the DC high voltage provided by the high voltage generator in response to the lower electrode charging signal, and a lower electrode second switch configured to supply the second AC high voltage to the lower electrostatic force generator during the second half cycle in which the first AC high voltage is not applied and to discharge electric charges charged in the lower electrostatic force generator during the second half cycle in response to the lower electrode discharging signal.

4. The actuator of claim 1, wherein a sequence in which the AC high voltage is applied to any one electrostatic force generator and electric charges charged in the other electrostatic force generator are discharged during one half cycle is alternately repeated with respect to the electrostatic force generators.

* * * * *